Jan. 19, 1971  M. BRUNNER  3,556,774
PROCESS FOR THE REDUCTION OF MOLTEN IRON ORE
Filed Nov. 8, 1967
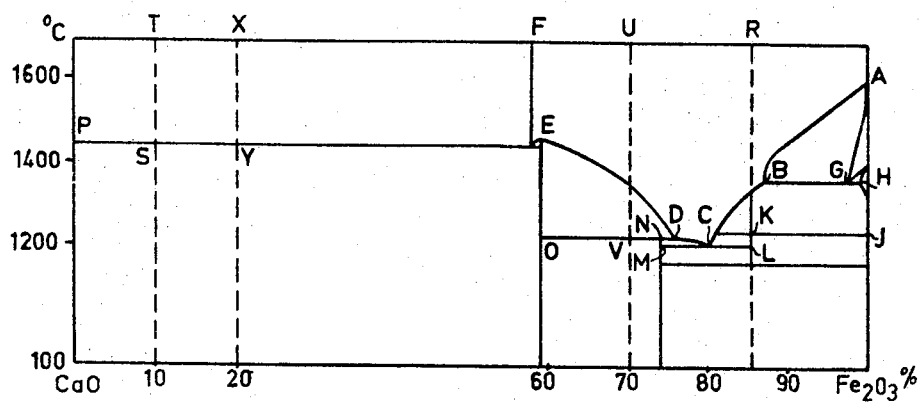
Inventor
Mihaly Brunner
by Sommers&Young
Attorneys United States Patent Office 3,556,774
Patented Jan. 19, 1971

3,556,774
PROCESS FOR THE REDUCTION OF MOLTEN
IRON ORE
Mihaly Brunner, 3 Kometvagen, Roslags-Nasby, Sweden
Filed Nov. 8, 1967, Ser. No. 681,527
Claims priority, application Sweden, Nov. 15, 1966,
15,602/66
Int. Cl. C21c 7/00, 7/06
U.S. Cl. 75—57
4 Claims

ABSTRACT OF THE DISCLOSURE

A process for the reduction of molten iron ore. A reducing agent is added to a melt containing 10–85% iron ore and 15–90% CaO. The reduction is carried out in a furnace lined with CaO.

---

This invention relates to a process for the reduction of molten iron ore.

Such processes have been previously known. In general, they have been carried out in such a way that the molten iron ore has been placed on the surface of a bath of molten steel and that the reduction has been carried out at the contact surface between the iron ore and the steel. When the carbon content of the steel has decreased to a certain value the process has been interrupted; then depleted iron ore melt and part of the steel melt have been removed. The remaining part of the steel melt has been carburized, whereupon the process has been repeated. The process has also been known to have been carried out in a continuous manner.

It has also been known how to reduce an iron ore melt with reducing agents which do not originate from carbonaceous steel. In this case conventional fluxing materials and slag formers have been added to the iron ore melt.

However, in these known processes the molten iron oxides have been extremely aggressive to the lining of the furnace. Further, the reduction has been relatively slow owing to the circumstance that the contact surface between the reducing agent and the iron ore has been relatively small and also owing to the circumstance that the reductibility of the iron ore has been relatively low, probably depending on a high content of $SiO_2$ in the melt.

By the present invention these disadvantages are eliminated either entirely or partly. The present invention is characterized in that the reduction is carried out by the addition of reducing agents to a melt containing:

less than 85 percent, preferably less than 75 percent oxidic iron ore;
more than 10 percent, preferably more than 20 percent oxidic iron ore;
less than 90 percent, preferably less than 80 percent CaO; and
more than 15 percent, preferably more than 30 percent CaO and the remainder unintentional impurities originating from iron ore and reducing agents and from reduction products; the reduction being carried out in a furnace lined with a refractory material containing lime, preferably in a furnace lined with lime.

With the object of clarifying the present to the accompanying drawing which shows part of a equilibrium diagram for the system $CaO$-$Fe_2O_3$. The drawing shows a equilibrium diagram for part of the system $CaO$-$Fe_2O_3$. The lefthand limiting line in the diagram refers to the composition 0 percent $Fe_2O_3$ and 100 percent $CaO$, and the righthand line to 0 percent $CaO$ and 100 percent $Fe_2O_3$. The diagram covers the temperature range 1050–1650° C. That part of the liquidus curve of the two-phase system which is shown consists of the connection line between the points A–B–C–D–E–F and the solidus curve of the connection line between the points A–G–H–I–K–L–M–N–O–E–P. The range useable for the invention is limited by the points R–L–M–N–O–E–S–T. It is true that the diagram does not go beyond 1650° C. but it lies within the scope of the invention to use higher temperatures. The upper temperature limit is determined entirely by the characteristics of the furnace. From a metallurgical point of view higher temperatures are advantageous. The lower temperature limit is determined by the solidus curve M–L (about 1200° C.) for melts with 74–85 percent $Fe_2O_3$ and the remainder CaO. For melts with 58–74 percent $Fe_2O_3$ the lower temperature limit is determined by the line O–N (about 1225° C.) and for melts with 10–58 percent by the line S–E (about 1440° C.).

The preferred composition area is limited by the connection line between points W–V–O–E–Y–X.

Owing to the fact that the iron ore melt is CaO-rich and suitably so CaO-rich that CaO starts to precipitate from the melt it is extremely suitable to line the furnace with CaO-containing refractory material, preferably with CaO. If the composition of the melt is such that CaO starts to precipitate or already exists in a solid phase (the area of and to the left of line EF in the figure) i.e. when the melt is saturated with regard to CaO, it is expected to have a low dissolving power against the likewise CaO-containing lining material. At a lower temperature than that represented by point E solid $2CaO \cdot Fe_2O_3$ separates from the oxidic melt if its composition is within area EOD. A melt saturated in respect of $2CaO \cdot Fe_2O_3$ has a very slight dissolving power against a refractory material which consists mainly of lime, since the dissolving product between melt and refractory material $2CaO \cdot Fe_2O_3$ is solid at the temperature in question.

The CaO-rich iron ore melt has the further advantage that the reduction is rapid, which probably depends on the circumstance that the reductibility of the iron oxides increases with an increased CaO content. According to certain newer theories CaO is dissociated; during the meeting process thereby producing a large excess of oxygen ions in the melt. The reductibility of an iron oxide melt increases with an increased concentration of oxygen ions in the melt.

In addition the present invention has the advantage that the extremely high-basic melt binds sulphur and phosphorus in the iron ore in such a way that the completely reduced iron has a very low content of S and P. On the whole the iron is very pure and has a low C content, whereby it is well suited as a charging material for the production of stainless steel. However, the iron has a rather high content of oxygen; after deoxidation it is well suited to a number of purposes by the addition of the desired alloying elements.

An additional advantage is that the process does not require any specific reducing agent; optional gaseous, liquid or solid reducing agents may be used, for instance, slack coal or oil.

When starting the process finely divided iron ore may suitably be mixed with finely divided CaO or $CaCO_3$ and the mixture melted.

When the process has reached continuity $Fe_2O_3$ is added at the same rate as Fe is obtained by reduction, CaO is simultaneously added in order to bind the acid ingredients which are present in the iron ores, particularly $SiO_2$ and $P_2O_5$ with a view to maintaining a large excess of oxygen ions in the melt. The reducing agent is also preferably added continuously or in small amounts.

When a reducing agent is added to the melt of iron ore and lime in discontinuous operation the composition is displaced, since $Fe_2O_3$ under the effect of the reducing agent passes into a lower state of oxidation. If a reducing agent is added to the newly charged melt the composition will be displaced at first in the process of the separation of carbon monoxide and carbondioxide and fairly soon also under the separation of metallic iron.

According to another embodiment of the present invention the process may be carried out continuously, i.e. the reduced iron ore can continuously be replaced by further ore practically to the same extent as Fe is obtained by reduction, and CaO practically at the same rate as, the acid ingredients are added by the iron ore addition. In this case one maintains a practically constant and suitable composition of the oxidic melt during the reduction process.

According to a further embodiment of the present invention the process is carried out as a combination of the discontinuous and the continuous embodiments when, during a certain phase of the process, the reduced ore is replaced by further ore while at certain times, preferably prior to the removal of the iron from the furnace, no addition of iron is made. The composition of the oxidic melt may thus be varied as desired so that optimum conditions prevail in the furnace at the moment of discharge. The reduction may, for instance, be carried on in a continuous manner for a certain time and then prior to the discharge of the iron, for instance, continued without the addition of iron ore; when the content of iron oxide has decreased sufficiently the discharge takes place.

According to the present invention the composition of the melt may be varied in many different ways during the reduction process; the most suitable method of operation to be chosen will depend on the rest of the conditions, in the first place the character of the iron ore.

The temperature, too, may be changed during the reduction process according to the combined reduction process described above; the continuous phase may be carried out, for instance, at lower temperatures, and the final or discontinuous phase at higher temperatures. It is thus possible to carry out the main part of the reduction below the melting point of the iron and finish the reduction at a temperature above the melting point of the iron, and then remove the iron in a liquid state these reduction steps may also be carried out in separate furnaces.

In order to obtain a good heating economy the formed CO ought to be burnt and the combusition heat be returned to the process. This combustion may suitably be carried out by means of oxygen gas. In order to obtain a good heat transfer between the combustion gas and the charge and to obtain a high reduction speed the bath should be stirred in some suitable way, for instance, by using a rotary furnace.

An example of the embodiment of the present invention will be described in the following.

A magnetite ore with the following composition:

|   | Percent |
|---|---|
| $Fe_2O_3$ | 70.7 |
| FeO | 28.42 |
| $SiO_2$ | .51 |
| P | .014 |
| CaO | .20 |
| $Al_2O_3$ | .29 |
| Mn (metal) | .05 |
| MgO | .29 | was finely divided and mixed with finely divided lime in a proportion 75 percent magnetite and 25 percent CaO. The mixture was heated to 1580° C. when the entire mixture was melted. Coke breeze was added for the reduction, CO being produced under heavy foam and Fe was obtained (discontinuous operation).

The obtained iron had the following composition:

|   | Percent |
|---|---|
| C | 0.1 |
| Si | Traces |
| S | .017 |
| P | .008 |
| O | .11 |

Rich, finely divided iron ores are most suitable for reduction according to the present method. High contents of non-basic oxides ($SiO_2$, $P_2O_5$ and $Al_2O_3$) are not desirable since relatively large additions of lime are required in this case in order to maintain a large excess of lime or, in other words, a high basicity.

$$\frac{CaO+MgO}{SiO_2+P_2O_5+Al_2O_3}$$

When reducing ores with a relatively high content of non-basic oxides the addition of lime should be limited for economic reasons. It is not the object of the present invention to indicate a determined lowest limit for the basicity of the melt. For rich or basic ores the basicity may be kept very high, for instance above 10 or 20. It may however be allowed to sink as low as 4 without any disadvantage. For poor and acid ores the basicity may suitably be lowered even more, for instance to 3 or below 3. A disadvantage of relatively low basicities is that the dissolving power of oxidic melt against the limy lining increases.

What I claim is:

1. A process for the reduction of molten iron ore comprising:

forming a binary melt of admixed 10 to 85 percent iron oxide and 15 to 90 percent CaO in a furnace;

adding at least one reducing agent to said binary melt;

reducing said molten iron ore and discharging a substantially ferrous metal from said furnace;

adding iron ore and additional reducing agent to respectively compensate for the previously reduced iron oxides and to reduce the said additional iron ore; and adding CaO to maintain in the melt a large excess of CaO over the non-basic oxides and to have a melt basicity of at least 3.

2. A process in accordance with claim 1 wherein finely divided $CaCO_3$ is admixed with the iron ore to form a binary melt.

3. A process in accordance with claim 1 wherein the said reduction process is carried out in said furnace lined with a refractory material consisting essentially of CaO.

4. A process in accordance with claim 1, which is continuously and discontinuously carried out while respectively continuously and discontinuously discharging said metal.

References Cited

UNITED STATES PATENTS

| 231,121 | 8/1880 | Thomas et al. | 75—95 |
| 265,069 | 9/1882 | Henderson | 75—95 |
| 620,310 | 2/1899 | Hadfield | 75—95 |
| 3,002,832 | 10/1961 | Moussoulos | 75—40 |
| 3,038,795 | 6/1962 | Rummel | 75—40 |
| 3,042,513 | 7/1962 | Crome | 75—40 |

L. DEWAYNE RUTLEDGE, Primary Examiner

J. E. LEGRU, Assistant Examiner

U.S. Cl. X.R.

75—29, 34, 40, 51